United States Patent Office 3,364,162
Patented Jan. 16, 1968

3,364,162
AQUEOUS EMULSIONS ADAPTED FOR ELECTROPHORETIC FILM DEPOSITION
Olin W. Huggard, Rocky River, Ohio, assignor, by mesne assignments, to Mobil Oil Corporation, a corporation of New York
No Drawing. Application May 16, 1963, Ser. No. 281,027, now Patent No. 3,297,557, dated Jan. 10, 1967, which is a continuation-in-part of application Ser. No. 196,467, May 21, 1962. Divided and this application Oct. 11, 1966, Ser. No. 585,780
12 Claims. (Cl. 260—22)

ABSTRACT OF THE DISCLOSURE

Aqueous emulsions adapted for electrophoretic film deposition are provided in which the continuous phase has dissolved therein a volatile nitrogenous base salt with acidic adducts which are illustrated by maleated or fumarated oils and the like, these adducts have an acid number of at least 40 and being heat bodied and substantially devoid of anhydride groups. The dispersed phase is constituted by oil-soluble resinous polyol esters which are provided in organic solvent solution using solvents of only limited water miscibility preferably illustrated by aromatic hydrocarbon solvents or high boiling water insoluble alcohols.

The present application is a division of my prior application, Ser. No. 281,027, filed May 16, 1963 now U.S. Patent No. 3,297,557, issued Jan. 10, 1967, which, in turn, is a continuation-in-part of my prior application, Ser. No. 196,467, filed May 21, 1962, now abandoned.

The present invention relates to the electrophoretic deposition of organic resinous coatings in order to efficiently deposit smooth resinous films of superior chemical resistance from aqueous medium onto a conductive surface and includes new aqueous emulsion systems uniquely adapted for such purpose.

The electrophoretic deposition of organic resinous coatings from aqueous medium is well known, but it has achieved only limited recognition in commerce despite the obvious advantage inherent in the use of water systems and the direct application coating from a system of minimum solvent content to an article in its final physical form.

More particularly, a commercially feasible system must provide numerous properties in combination, including stability, low current requirements for electrodeposition, effective electrodeposition using direct current of low amperage, the capacity to deposit a film in deep recesses, good flow at low solvent content or even in the absence of solvent, and the capacity to be water insoluble immediately upon electrical deposition and to cure to provide superior chemical resistance and weather resistance. Since a desirable commercial system must possess all of these divergent characteristics in some considerable degree, the provision of a practical system is a difficult matter.

In accordance with the present invention, an aqueous emulsion adapted to efficiently deposit a water insoluble film upon electrophoretic deposition is provided by dispersing oil-soluble resin as hereinafter defined in a continuous aqueous phase containing dissolved salt of a base, preferably a volatile nitrogenous base, with the heat-reaction product of aliphatic alpha,beta-ethylenically unsaturated carboxylic acid with polyester of unsaturated fatty acid and aliphatic polyhydric alcohol, the heat-reaction product having an acid number of at least 40, preferably at least 80. Preferred heat-reaction products have a viscosity measured at 220° F. at 100% solids of at least T on the Gardner scale and are substantially devoid of anhydride groups. The oil-soluble resin which is dispersed is a resinous polyol at least partially esterified with monobasic carboxylic acid providing easy flowability and compatibility with the heat-reaction product in the film which is deposited. The resinous polyol is preferably esterified only partially to leave some hydroxyl groups unreacted. While partial esterification is preferred, it is not essential for the heat-curing reaction can still take place.

These aqueous emulsions can be provided in stable form and are well adapted for electrophoretic deposition to provide compatible and easily flowable films which are water insoluble immediately upon deposition and which are heat curable to provide superior resistance to corrosion and weathering.

The advantages of the invention as well as the practice thereof will be more fully understood from the description which follows.

As previously indicated, the aqueous emulsions which are used in the invention include a continuous aqueous phase which contains dissolved salt, preferably volatile nitrogenous base salt, of resinous heat-reaction product. This heat-reaction product is provided by heat-reacting aliphatic alpha,beta-ethylenically unsaturated carboxylic acid with polyester of unsaturated fatty acid and aliphatic polyhydric alcohol, the heat-reaction product having an acid number of at least 40, preferably at least 80. The polyester is usually an unsaturated oil and it is convenient to employ the term unsaturated oil in the discussion which follows.

In accordance with the invention, an aliphatic alpha, beta-unsaturated carboxylic acid is first reacted with an unsaturated oil to couple the two together. It is possible for the unsaturated acid and the unsaturated oil to combine in various ways. Thus, if either the oil or the acid includes conjugated double bonds, an adduct therebetween can be formed by means of the Diels-Alder reaction. The oil and the acid can also combine together when the unsaturation involved is that of isolated double bonds by a straight addition reaction. The addition reaction is preferred, but the invention is not limited thereto.

Any unsaturated oil may be used in accordance with the invention. Thus, the unsaturated oil may be a semi-drying oil containing very little conjugated unsaturation, or the oil may be a drying oil which possesses a greater degree of unsaturation than a semi-drying oil, only a small proportion of the total unsaturation being conjugated unsaturation, or the oil may be a frosting oil which contains a substantial amount of conjugated unsaturation. It is preferred to employ oils which are triglycerides of unsaturated fatty acids, but unsaturated fatty acid esters of other aliphatic polyols such as tall oil esters of pentaerythritol or trimethylol propane may be used. Preferred oils are dehydrated castor oil, soya oil, linseed oil, tung oil, oiticia oil or safflower oil. The selection of oil may be of importance in certain situations. For example, oils can be bodied by heat, catalyst or monomer additives, as is known. Bodied oils are desirably used in the invention when it is desired to shorten the time of reaction with the acid. Frosting oils are desirably used to minimize the temperature required for reaction with the acid. The presence of peroxy catalysts is also useful to minimize reaction temperature, irrespective of which oil is selected. Small proportions of vinyl monomer are also useful to body the oil which is selected by copolymerization.

Any aliphatic alpha,beta-unsaturated carboxylic acid may be used in accordance with the invention. The preferred acids are monoethylenically unsaturated and dicarboxylic. The presently preferred acid is fumaric acid, but maleic acid is also good. Other acids from the class already defined, such as crotonic acid, acrylic acid and sorbic acid may be used. The term "acid" is intended to broadly include the acid in the form of its anhydride, e.g., maleic anhydride may be used. It is stressed, however, that the presence of anhydride groups in the final product is not preferred and is desirably avoided. Thus, and to obtain best results, the anhydride groups are preferably eliminated from the product as by hydrolysis and/or by esterification. Better still, the acid is used in the form of free acid, preferably fumaric acid, and reaction conditions are selected, as will be later more fully explained, to substantially preclude the elimination of water during the formation and bodying of the oil-acid adduct and the consequent formation of the less desired anhydride group.

The proportion of oil to acid is not of primary significance. It is necessary, however, that the reaction product of oil and acid contain sufficient acid as defined by its acid number to enable the base, e.g., volatile nitrogenous base, to combine with the acid reaction product to form a water dispersible salt, the term "water dispersible" including materials which dissolve or which can be reduced in water. Preferably, the salt is dissolved in the continuous aqueous phase of the emulsion. The oil-acid reaction product desirably possesses an acid number of at least 40. The maximum proportion of acid which is used for reaction with the oil is dictated by the stoichiometry of the system. In brief, one should not use such a large proportion of acid that it cannot fully react with the oil.

The proportions which are used in accordance with the invention may be illustrated by the reaction of fumaric acid with soya oil. With these two reactants, fumaric acid is used in an amount of from 10–40%, preferably from 10–30% by weight of the total weight of acid and oil, the balance being soya oil.

It is presently preferred to employ as little acid as possible leading to water solubility to provide films having the greatest resistance to corrosion. Also, it is particularly preferred to employ materials of maximum body or viscosity consistent with water solubility. Acrylic acid is desirably used in amounts of from about 1 to about 5% based on the weight of the adduct, preferably together with up to about 25% based on the weight of the adduct of other vinyl monomers such as styrene, vinyl toluene, methyl methacrylate or acrylonitrile, to increase the viscosity of the preformed adduct by copolymerization. Based on total vinyl monomer, the acid monomer is desirably used in an amount of from 2–50% by weight. In such instance, the total weight of acid in the final bodied adduct is preferably within the range of from 5–30 percent by weight, based on total weight of final bodied adduct especially when fumaric acid is the principal acid component, e.g., at least 60% of total acid.

The reaction between the oil and the acid is broadly a relatively simple one and it is merely necessary to cook the oil into the acid as by heating the two together at an appropriate elevated temperature. Heating should be continued until a clear product is produced having the desired viscosity.

Viscosity can be built up in numerous ways, and efforts to build viscosity may precede, accompany or follow adduct formation. In this regard the use of bodied oils of various type has previously been mentioned. Similarly, the elevated temperature used to form the adduct has a bodying effect, higher temperatures up to about 240–260° C. being more rapid in this regard. As a feature of the invention, temperatures over about 425° F. are preferably avoided, preferred temperatures being in the range of about 350–400° F. to avoid liberation of water and consequent anhydride formation. These lower temperatures are appropriate for adequate viscosity build when the oil is a bodied oil, or a highly reactive oil such as a frosting oil, or when peroxy catalysts are present, or when proportions of vinyl monomer are present. Indeed, and even in the absence of one or more of the foregoing, greater viscosity build can be obtained by a longer cook and without significant release of water.

Thus, and in accordance with preferred practice, the final adduct which is used has a viscosity measured at 220° F. at 100% solids of at least T, preferably at least V, on the Gardner scale, and is substantially devoid of anhydride groups.

The substantial absence of anhydride groups is easily noted during manufacture by the fact that there is on rapid evolution of water as is easily noted by the occurrence of substantial foaming when reaction temperatures substantially higher than those preferred are used.

The specific nature of the volatile nitrogenous base which is preferred is not a primary feature of the invention. In selecting the volatile base, the base is desirably of sufficient volatility to vaporize so that at least a large portion of the base will leave the film which is deposited during the operation of drying the film. Ammonia is a praticularly preferred nitrogenous base, but other volatile bases such as volatile aliphatic amines may be employed. Volatile aliphatic amines are illustrated by monomethyl amine, dimethyl amine, diethyl amine, triethyl amine, and morpholine. While volatile nitrogenous bases are preferred, non-volatile bases may, less desirably, be used such as sodium and potassium which may be employed in the form of hydroxides of alkaline salts such as carbonates.

The proportion of base which is used is of secondary significance. Broadly, enough base is used to dissolve the heat-reaction product. Preferably, a stoichiometric excess of base is used calculated on the carboxyl functionality of the heat reaction product, e.g., a 10–100% molar excess, to insure stability of the final aqueous emulsion, but the mechanism used for emulsion stability is of secondary importance.

Thus the oil-acid heat-reaction product is simply dissolved in water containing the selected base, preferably ammonia, to provide the aqueous phase of the desired emulsion.

The preparation of a preferred oil-acid heat-reaction product and its dissolution in water containing volatile nitrogenous base is illustrated in Examples I and II.

*Example I*

The reaction vessel is a 20 gallon stainless steel kettle equipped with a stainless steel lid and agitator as well as a thermometer. Alkali refined soya oil, in an amount of 72 pounds, is introduced into the kettle. The oil is heated, with agitation, to a temperature of 220° F., at which time 28 pounds of fumaric acid are added. Heating and agitation are continued and after a total heating time of 1¼ hours, the reaction temperature of 500° F. is reached. After 1 hour at this temperature the reaction is sampled and the acid number of the adduct is found to be 159. The reaction is continued for 30 minutes and then cooled to 375° F., before filtration and subsequent storage in phenolic lined containers. The properties of the adduct are as follows:

Solids _____ 100 percent.
Acid number _____ 145.
Viscosity—at 40 percent solids in toluene _ 22 cps.
Viscostiy—at 100° F., 100 percent solids __ 78,000 cps.
Color _____ Clear dark amber.

Repeating Example I, but varying the rate of heating, the use of a slower rate of heating causes the reaction mixture to take a longer time to reach the 500° F. temperature specified. Modifying the procedure in this manner provides a higher viscosity, but useful product. Similarly, if the reaction mixture is heated more rapidly, it tends to foam and this procedure, while operative, is less commercially desirable.

The reaction temperature of 500° F. is not critical.

If the reaction is performed at 400° F., a longer period of time is required to reach the desired acid number. The product is a useful one, though it is a higher viscosity. Similarly, temperatures higher than 500° F. can be employed so long as thermal decomposition is avoided, but the reaction mixture tends to foam which is detrimental for best operation.

Example II

The equipment required is a steam jacketed mixing vessel equipped with an agitator.

35 parts of fumarated oil adduct, as prepared in Example I, are added to the mixer and are heated about 170° F.

65 parts of a dilute ammonium hydroxide solution are added with agitation. The dilute ammonium hydroxide solution is made by blending 10 parts of 28% ammonium hydroxide with 55 parts of water. These proportions may vary slightly. The mixture is agitated to produce a solution containing 35% resin solids.

In some instances, and as an optional feature, it is helpful to include in the aqueous phase a small proportion of water soluble organic solvent which serves as a coupling agent to improve solution clarity and to enhance film flow upon subsequent application and baking. Appropriate water soluble organic solvents for this purpose are alcohols such as ethanol, glycols such as ethylene glycol, propylene glycol and butylene glycol, glycol ethers such as 2-ethoxy ethanol and 2-butoxy ethanol as well as esters of said glycol ethers such as the acetate thereof.

The preparation of particularly preferred oil-acid heat-reaction products is illustrated in the following examples:

Example III

A mixture of 878 parts tung oil and 203 parts fumaric acid are heated to 420° F. and held at this temperature for the ten minutes and then cooled to 250° F. The adduct so-obtained is clear. A cut in xylene at 65% nonvolatile resin solids has a viscosity of U–V (Gardner-Holdt) and an acid number of 158.4. The resin is reduced to 40% nonvolatile resin solids in a blend of 79% (by weight) water, 15% ammonium hydroxide (28%), and 6% ethanol. The viscosity is X–Y (Gardner-Holdt).

Example IV

A mixture of 1750 parts linseed oil and 250 parts fumaric acid are heated to 500° F. and this temperature is maintained for about fifteen minutes to obtain a clear resin having a viscosity of W–X (Gardner-Holdt) and an acid number of 75.

To 1934 parts of the above adduct at 300° F. are added a blend of 163 parts vinyl toluene, 76 parts acrylic acid, and 7.2 parts ditertiary butyl peroxide, dropwise over a period of two hours. The temperature is maintained at 300° F. during the addition. After the addition is completed, the temperature is increased to 375° F. Hold at 375° F. for one hour and then add two increments of 5 parts ditertiarybutyl peroxide at an interval of one hour. Hold for an additional hour after the last increment is added. The viscosity of a cut at 50% non-volatile resin solids in xylene is B+ and the acid number is 90.4.

The resin is cooled to 250° F. and reduced to 40% non-volatile resin solids in a blend of 73.3% (by weight) water, 3.35% dimethylethanolamine, 3.35% ammonium hydroxide (28%) and 20% 2-butoxy-ethanol. The viscosity is X.

Example V

A mixture of 979 parts linseed oil, 326 parts tung oil, and 225 parts fumaric acid are heated to 400° F. This temperature is maintained for 8 hours to obtain a clear adduct. A cut at 50% non-volatile resin solids in xylene has a viscosity of A4 and an acid number of 103. Cool to 350° F. and then add 35 parts ditertiarybutyl peroxide over a period of 3½ hours. Hold for 45 minutes after the last addition. A cut at 50% non-volatile resin solids in xylene has a viscosity of F and an acid number of 98.4. The resin is cooled to 250° F. and reduced to 43% non-volatile resin solids in a blend of 59% (by weight) water, 32% 2-ethoxy ethanol and 9% diethylamine. The viscosity is Z2–Z3.

Referring more particularly to the oil-soluble phase which is dispersed in the continuous aqueous phase described hereinbefore, the resin component which is relied upon is a resinous polyol which may be of various types as indicated hereinafter.

One type of resinous polyol which may be used is an hydroxyl-functional resinous polyester, usually of the type which is commonly referred to as an alkyd resin. As is well known, these polyester resins are produced by a polyesterification reaction with phthalic acid or anhydride as the dicarboxylic acid and an aliphatic polyhydric alcohol containing at least three hydroxyl groups, usually glycerine or pentaerythritol either alone or together with a proportion of diol such as ethylene glycol or butane diol. The proportion of hydroxyl-containing component is normally in excess, e.g., of from 5–35%, to provide the desired hydroxyl-functional polyester resin. This polyester resin is at least partially esterified with monocarboxylic acid and usually with an unsaturated fatty acid which can be accomplished by direct esterification with the acid, or, less desirably by transesterification with an oil containing the desired acid.

As is also well known, there are numerous possible variations such as the use of proportions of iso and/or terephthalic acids, the use of trimellitic anhydride, or the use of aliphatic dicarboxylic acids such as adipic acid. The point of importance is the provision of a resinous material carrying a plurality of hydroxyl groups and the at least partial esterification thereof with fatty acid to enhance flowability and compatibility.

Despite the variety of materials which may be used, the alkyd resin or polyester resin must be a hydroxyl functional product permitting coreaction with the drying oil or drying fatty acid.

Preferred resinous polyols are allyl alcohol-containing resinous copolymers which are at least partially esterified with fatty acid to form the flowable and compatible esters which are desired in the oil-soluble dispersed phase.

Preferred allyl alcohol-containing copolymers are copolymers of from 1–40% by weight of an allyl alcohol such as allyl alcohol or methallyl alcohol or mixtures thereof with at least 30% by weight, preferably at least 50% by weight, of styrene, ring-substituted styrene in which the substituents may be halogen and/or lower alkyl radicals containing up to 4 carbon atoms and methyl methacrylate. Vinyl toluene is a preferred ring-substituted styrene. While the allyl alcohol-containing resinous copolymer can be liquid or solid, the copolymer which is solid at room temperature is preferred. The preferred copolymer components are normally solid resins which include sufficient hydroxyl groups to correspond to an allyl alcohol content of from 10–30% by weight.

The allyl alcohol-containing copolymer may also include other monoethylenically unsaturated monomers. The presence of small amounts of some monomer, such as acrylic acid, is helpful in the production of the copolymer, e.g., by making the copolymerization more rapid or by increasing conversion of monomer to copolymer. The presence of other monomers may also be desirable for the purpose of balancing the physical properties of the copolymer. Thus, up to 50% by weight of the copolymer may be constituted by a monoethylenically unsaturated ester containing from 2–20 carbon atoms in a terminal aliphatic hydrocarbon chain, these being illustrated by ethyl acrylate, n-butyl acrylate, 2-ethylhexyl acrylate, butyl methacrylate, vinyl acetate, and vinyl stearate.

A particular preferred copolymer of styrene and allyl alcohol, referred to hereinafter as styrene-allyl alcohol copolymer A, is prepared by copolymerization of styrene and allyl alcohol in a 50% by weight solution in xylene to provide a copolymer having the following characteristics:

Colorless, odorless, brittle solid.
Softening point (Durran's) _____°C__ 97
Density (25° C.) _____ 1.10
Molecular weight _____ 1150
Hydroxyl equivalents/100 gm. _____ 0.45
Average —OH per mol _____ 5.2

Copolymers as described above may be prepared by heating the mixed monomers in the presence of a free-radical polymerization catalyst and in the absence of oxygen at a temperature of from 180 to 300° C., as is more fully taught in United States Patent No. 2,894,938.

Any monocarboxylic acid may be used for the esterification, especially those containing a long hydrocarbon chain of from 12–22 carbon atoms, preferably from 16–20 carbon atoms. Both saturated and unsaturated acids may be selected. Thus, the acids derived from linseed oil, coconut oil, cottonseed oil, dehydrated castor oil and other similar acids may be used. Tall oil fatty acids are considered to be typical and will be used to illustrate the invention. Rosin is another preferred acid which can be used for the esterification. The preferred extent of partial esterification is from 45–70% based on the hydroxyl content of the resinous polyol which desirably has an hydroxyl equivalent weight of from 70–450 grams.

Esterification provides a more fluid resin having lower viscosity and superior flow in the high solids films which are deposited by electrophoresis.

In still another feature of the invention, there is included in the esterification reaction between the resinous polyol and the monocarboxylic acid a minor proportion (5–50% by weight based on the weight of acid) of frosting oil such as tung oil or oiticica oil. The frosting oil appears to participate in a transesterification reaction with the resinous polyol and provides a final electrodeposited film characterized by improved enamel hold-out leading to better gloss when an enamel topcoat is applied over the electrodeposited films of the invention.

While preferred resinous polyols have been described hereinbefore, the invention is not limited to any specific resinous polyol, but instead any resinous polyol may be used, other suitable resinous polyols being illustrated by polyepoxides containing recurring secondary hydroxyl groups, such as a diglycidyl ether of bisphenol A having an hydroxyl value of 0.32 equivalents per 100 grams, and by vinyl chloride copolymers containing hydrolyzed or saponified vinyl acetate such as a copolymer of 87 weight percent of vinyl chloride and 13 weight percent of vinyl acetate which has been hydrolyzed to provide a vinyl alcohol content of 6%. Similarly, copolymers containing 5–25% by weight of 2-hydroxy ethyl acrylate or methacrylate may be used to provide resinous materials containing numerous hydroxy groups which can be at least partially esterified for use in the invention.

The oil soluble resinous component in accordance with the invention is dispersed in the aqueous phase and such dispersion as well as the fluidity of the film which is deposited is facilitated or enhanced by the presence of small proportions of organic solvents, especially those of only limited water miscibility. Suitable solvents are aromatic hydrocarbons such as toluene and xylene as well as commercial mixtures thereof such as Solvesso 100. Still other suitable solvents are pine oil and butanol. Still higher boiling water-insoluble alcohols are particularly preferred, such as isooctyl alcohol. The organic solvent is employed in an amount of from 5–40% by weight of the oil soluble solution, preferably in an amount of from 10–30% by weight of the oil soluble solution.

As will be evident, the invention employs two compatible and heat-coreactive resins, one of which is dissolved in the aqueous phase and which supplies carboxyl functionality when the volatile nitrogenous base evaporates, and the other of which supplies hydroxyl reactivity for esterification or transesterification during the heat cure which is used. Proportions of these two resinous components is of secondary significance, weight ratios of from 10/90 to 90/10 being broadly useful. Preferred proportions are from 10/90 to 70/30.

It should be understood that minor proportions of other resinous components may also be used, especially in the oil soluble dispersed phase. Thus, minor amounts, such as 5–20% of the oil soluble resin, may be constituted by any film-forming resin including heat-hardening aminoplast resins such as condensates of urea or melamine or other triazine with excess formaldehyde, the condensate being desirably etherified as with butanol to enhance its solvent solubility.

As a feature of preferred practice, the oil soluble resin is blended with a minor proportion, such as 5–20%, of non heat-hardening formaldehyde condensate, especially condensates of phenols, including alkyl-substituted phenols, with a stoichiometric deficiency of formaldehyde. The use of non heat-hardening resins is helpful to minimize hardening during baking to improve flow-out while adding desirable film hardness to the final baked film.

Since deposition of the resins is by electrophoresis, the aqueous emulsion may be diluted with water to any desired extent, the extent of dilution being largely immaterial. Despite the dilution, the film deposited by electrophoresis will normally contain from 85–100% of non-volatile solid components and, since these are deposited from aqueous medium, there is little danger of solvent laden atmospheres and there is reduced solvent waste in comparison with solvent solution coatings.

The aqueous emulsions of the invention are used in conventional manner by passing a unidirectional electrical current through the emulsion to deposit the resin film upon an immersed object, such as an automobile body, which is the anode of the electrical system.

The invention is particularly directed to the application of primers, and for this purpose, it is desirable that the film which is deposited be pigmented by pigments suitable for use in primers, such as lead chromate and/or titanium dioxide. While the particular manner of pigmentation is of secondary importance, it is convenient to add the pigment to the oil soluble phase. Barytes, talc, calcium carbonate, iron oxide, titanium dioxide and lead chromate are examples of some of the suitable pigments. The pigment to binder ratio is desirably in the range of from 1:6 to 7:6.

Lead silico chromate, especially having an average particle size of 10–15 microns, is particularly preferred to provide superior resistance to corrosion. In the invention it has been found that this particular pigment is more advantageously used if it is dispersed in the aqueous phase of the coating composition in which it can be more stably suspended.

The invention is illustrated by the following examples of presently preferred practice, all parts and percentages being by weight unless otherwise specified.

*Example VI*

Thirty-one pounds of red iron oxide and fifty-one pounds of lead silico chromate are dispersed in a pebble mill with a mixture of four gallons of the water reducible vehicle, as detailed in Example III, and 1¼ gallons of water, until the desired degree of dispersion is obtained. The resulting paste is then reduced with an additional 33⅓ gallons of the water reducible vehicle, as used above, and as detailed in Example III. To the resulting pigment dispersion-resin mixture is added, under agitation, an oil soluble partially esterified styrenated-allyl alcohol copolymer resin solution which consists of 40.3% sytrene-allyl alcohol copolymer, 14.2% non-heat hardening phenol formaldehyde, 11.4% rosin, 25.6% tall oil fatty acid (4% rosin acid), and 8.5% oiticica oil processed to an acid value of 44 to 46 and reduced to 72.5% non-volatile resin solids in a mixture of aromatic hydrocarbon solvents having a boiling range of from 375–410° F.

After the 72½% solids solution, described above, has been added to the pigment dispersion-resin mixture, 33 gallons of water are added under agitation. The resulting emulsion is approximately 42 percent solids and has a viscosity of 14–20 seconds measured in a #4 Ford Cup at 80° F.

This emulsion is further reduced with the addition of 300–600 percent of its volume of water and applied on zinc phosphate treated steel using a direct electrical current of 190 volts until sufficient coating is deposited to form a final (dry) film having a thickness of 0.9–1.0 mil. The freshly deposited coating resists removal by fast running tap water, and, when the coated and water-rinsed article is baked for 20 minutes at 350° F., the coating cures to provide excellent weather resistance.

*Example VII*

Example VI is repeated, replacing the water reducible resin solution of Example III, with a corersponding volume of the water reducible resin solution of Example II. Corresponding results are obtained.

*Example VIII*

Example VI is repeated, replacing the water reducible resin solution of Example III, with a corresponding volume of the water reducible resin solution of Example IV. Corresponding results are obtained.

*Example IX*

Example VI is repeated, replacing the water reducible resin solution of Example III, with a corresponding volume of the water reducible resin solution of Example V. Corresponding results are obtained.

Examples VI–IX may be modified by the inclusion of minor amounts of suspending agents or defoamers, or both, to enhance the working properties in use under production conditions. These are illustrated by the incorporation of water-dispersible soya lecithin in the pigment dispersion stage in an amount of 2% by weight of pigments, and by the incorporation of 1%, based on total volume, of odorless mineral spirits or synthetic chemical surfactant in the pigment dispersion which is ground.

The invention is defined in the claims which follow.

I claim:

1. An aqueous emulsion adapted for electrophoretic film deposition comprising, a continuous aqueous phase having dissolved therein a salt of a volatile nitrogeneous base with the heat-reaction product of aliphatic monoethylenically unsaturated dicarboxylic acid with polyester of unsaturated fatty acid and aliphatic polyhydric alcohol, said heat-reaction product having an acid number of at least 40, said heat-reaction product further having a viscosity measured at 220° F. at 100% solids of at least T on the Gardner scale and being substantially devoid of anhydride groups, and an oil-soluble dispersed phase comprising resinous polyol at least partially esterified with monobasic carboxylic acid to provide a resinous polyol ester compatible with said heat-reaction product in the film deposited, said heat-reaction product and said resinous polyol ester being present in said emulsion in a weight ratio of from 10/90 to 90/10, and said resinous polyol ester being dispersed as an organic solvent solution containing from 5–40% by weight of the solution of organic solvents of only limited water miscibility.

2. The aqueous emulsion of claim 1 in which said organic solvents of only limited water miscibility are aromatic hydrocarbon solvents.

3. The aqueous emulsion of claim 1 in which said heat-reaction product contains from 5–30% by weight of said dicarboxylic acid, based on the total weight of said heat-reaction product, and said heat-reaction product includes copolymerized vinyl monomer up to about 30 parts of said monomer being present per 100 parts of said product.

4. The aqueous emulsion of claim 1 in which said polyester of unsaturated fatty acid and aliphatic polyhydric alcohol is a drying oil fatty acid triglyceride.

5. The aqueous emulsion of claim 1 in which said resinous polyol ester is constituted by resinous polyol partially esterified with monobasic carboxylic acid having from 16–20 carbon atoms to an extent of from 45–70% based on the hydroxyl content of said resinous polyol.

6. The aqueous emulsion of claim 1 in which said dicarboxylic acid is selected from the group consisting of fumaric acid, maleic acid, and maleic anhydride.

7. The aqueous emulsion of claim 1 in which said organic solvents of only limited water miscibility are present in said dispersed phase in an amount of from 10–30%, based on the weight of the oil-soluble solution.

8. The aqueous emulsion of claim 1 in which said aqueous phase includes dispersed lead silicate chromate pigment.

9. The aqueous emusion of claim 1 in which said organic solvents of only limited water miscibility comprise high boiling water-insoluble alcohol.

10. The aqueous emulsion of claim 1 in which said resinous polyol is a copolymer containing an allyl alcohol.

11. The aqueous emulsion of claim 10 in which said allyl alcohol-containing copolymer includes at least 30% by weight of styrene or vinyl toluene.

12. An aqueous emulsion adapted for electropheretic film deposition comprising, a continuous aqueous phase having dissolved therein a salt of a volatile nitrogeneous base with the heat-reaction product of aliphatic monoethylenically unsaturated dicarboxylic acid selected from the group consisting of furmaric acid, maleic acid and maleic anhydride with drying oil fatty acid triglyceride, said heat-reaction product having an acid number of at least 40, said heat-reaction product further having a viscosity measured at 220° F. at 100% solids of at least T on the Gardner scale and being substantially devoid of anhydride groups, and an oil-soluble phase stably dispersed in said aqueous phase, said oil-soluble phase comprising resinous polyol ester constituted by resinous polyol partially esterified with monobasic carboxylic acid having from 16–20 carbon atoms to an extent of from 45–70% based on the hydroxyl content of said resinous polyol to provide a resinous polyol ester compatible with said heat-reaction product in the film deposited, said heat-reaction product and said resinous polyol ester being present in said emulsion in a weight ratio of from 10/90 to 90/10, and said resinous polyol ester being present in a solution containing from 5–40% by weight of the solution of solution of aromatic hydrocarbon solvent.

References Cited

UNITED STATES PATENTS

| | | | |
|---|---|---|---|
| 2,941,968 | 6/1960 | McKenna | 260—22 |
| 3,077,459 | 2/1963 | Hershey et al. | 260—22 |
| 3,230,162 | 1/1966 | Gilchrist | 204—181 |

DANALD E. CZAJA, *Primary Examiner.*

LEON J. BERCOVITZ, *Examiner.*

R. W. GRIFFIN, *Assistant Examiner.*